July 10, 1923.  
L. B. HANCOCK  
DEMOUNTABLE RIM FOR TIRES  
Filed Aug. 6, 1920  
1,461,311
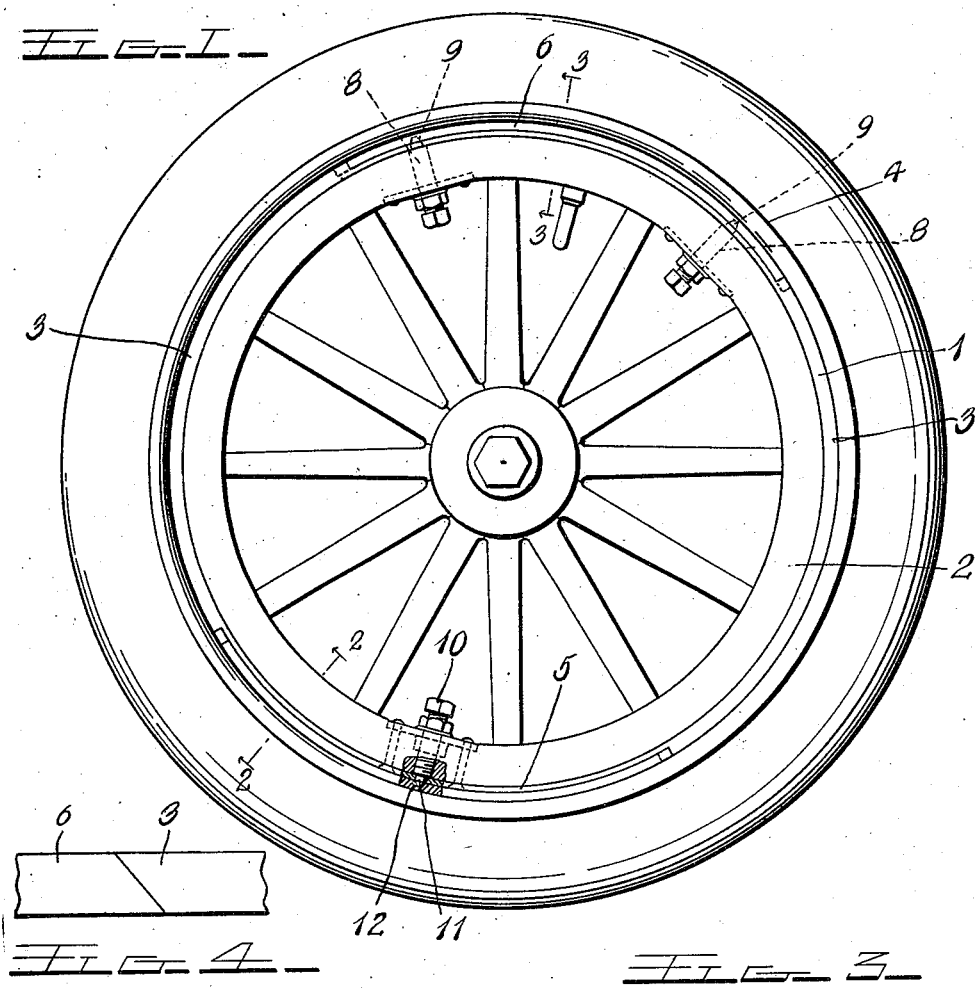
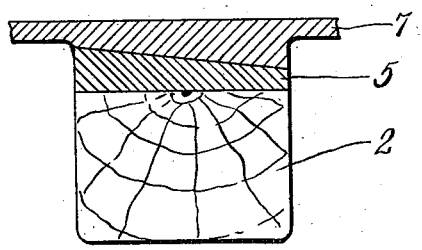
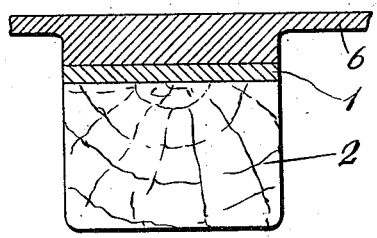
Inventor  
Lee B. Hancock,  
By  
Attorney Patented July 10, 1923.

1,461,311

UNITED STATES PATENT OFFICE.

LEE B. HANCOCK, OF RICHMOND, VIRGINIA.

DEMOUNTABLE RIM FOR TIRES.

Application filed August 6, 1920. Serial No. 401,690.

*To all whom it may concern:*

Be it known that I, LEE B. HANCOCK, a citizen of the United States, residing at Richmond, in the county of Henrico and State of Virginia, have invented certain new and useful Improvements in Demountable Rims for Tires, of which the following is a specification.

This invention relates to automobile wheels, and it relates particularly to the construction of the felly bands and of the rims to which a resilient or other tire is attached.

The object which I have in view is to provide a felly band and a rim in a structure of the kind referred to of such form that when the parts are in position for use a continuous bearing for the rim shall be presented and the rim be prevented from creeping. A further object is to provide a felly band and a rim each provided with projections or ribs which when the parts are assembled shall form a continuous bearing for the rim, and in which a portion of such projections or ribs shall be transversely inclined in order that when the parts are drawn together a tight and rigid connection between them shall be accomplished.

Further, the object is to provide a felly band and a rim having the above mentioned characteristics and in which the parts are so formed as to permit of accurate positioning for use without the exercise of skill or care on the part of a person assembling them.

With these objects to be accomplished, my invention resides in the novel features of construction and arrangement of the felly band and rim of an automobile wheel substantially as hereinafter described and claimed.

The preferred form of embodiment of the invention is illustrated in the accompanying drawing, in which:

Figure 1 is a side view of an automobile wheel in which the felly band and rim are of the improved construction;

Figure 2 is a transverse sectional view on the line 2—2 of Figure 1;

Figure 3 is a sectional view on line 3—3 of Figure 1; and

Figure 4 is a fragmentary view, showing the forms of the ends of the ribs or projections with which the felly band and rim are provided.

In the drawing I have shown an automobile wheel in which the felly band 1 is attached to a common form of wooden felly 2. The felly band is recessed at opposite portions of its diameter to form two or more outwardly projecting rib sections 3 and to form between these rib sections the relatively thin portions 5. The protuberant or projecting portions 3 are of the same thickness transversely and throughout the length of these portions the ends of the ribs or protuberant portions 3 are beveled in order to form outwardly divergent shoulders or walls at the ends of the recessed portions 5. The recessed portions 5 have an inclined outer face, as illustrated in Figure 2, so that the band at these recessed portions is higher at its inner edge than at its outer edge.

The rim 4 used in connection with this felly band has formed on its inner face two inwardly projecting portions 6 which engage within the recesses 5, the ends of these projecting portions or ribs 6 being beveled at 7 oppositely to these short shoulders on the felly band in order that when the rib is slipped on the band the parts will be guided to and rigidly held in their relative positions. The ribs 6 have inclined inner faces to coact with the inclined outer faces of the recessed portions 5 of the felly band.

While I have illustrated the felly band as being provided with two projecting portions and two recessed portions and the rim as having two projecting portions to fit in the recessed portions of the felly band, I do not wish to be limited to this, as it is obvious that the number of interengaging ribs and recesses on the respective parts is immaterial and that any number of these ribs and recess may be used.

The rim may be drawn into place on the felly band and rigidly secured by any suitable means. The means illustrated consists of screw-threaded studs or pins 8 which project radially through the felly band and which enter sockets 9 in the ribs or protuberant face of the rim. Each of these screws 8 has a wrench head 10 and a rounded or tapering head 11. Each of these screws passes through a screw-threaded plate 12 which is held to the felly in any suitable manner, as by the rivets 13. Binding nuts 14 may be used for holding the screw pins 8 in their set positions.

In assembling, the screw or studs 8 are turned out so that they do not project beyond the inclined faces of the recessed portions 5 and the rim is then moved laterally over the felly band until the ends of the screws 8 are disposed over or in register with the outer portion of the tapering sockets 11 in the rim, and the screws are then turned to cause them to enter the sockets and this action, because of the rounded extremities of the screws, causes the rim to be forced inward over the felly. This inward movement causes the beveled rib portion of the rim to slide over the oppositely beveled rib portion of the felly band and results in the bringing together tightly of the adjacent contacting parts of the rim and felly band, forming a continuous solid bearing for the rim. The advantage of the provision of the oppositely beveled ends of the ribs of the parts will be apparent. No great care or skill is requisite in the initial placing of the rim on the felly because as the rim is forced into operative position it is guided into and finally retained in its predetermined position secure against creeping, and, therefore, wear of the parts in use and injury to a tire valve tube extending through the rim and felly are avoided.

I claim:

1. In a wheel having a felly, a felly band encircling said felly circumferentially recessed on its outer face, the face of said recess being laterally inclined, the end walls of said recess being laterally inclined, a rim fitting upon the band and having a circumferentially extending projecting portion on its inner face fitting said recess and having its ends inclined complementarily to the inclined end walls of the recess and means for detachably holding the rim in place upon the felly band.

2. In a wheel, a felly, a felly band encircling the felly circumferentially recessed on its outer face for a distance, the face of said recess being laterally inclined, and a rim fitting upon the band and having a circumferentially extending, protuberant portion on its inner face fitting said recess in the felly band, said protuberant portion having a laterally inclined face, and means for detachably locking the rim in place upon the felly band comprising studs projecting outward from the felly band, the rim having sockets within which said studs engage, and a screw passing through the felly and felly band and having a tapering extremity, the rim being provided on its inner face with a tapering socket in which said extremity is adapted to engage.

In testimony whereof I affix my signature.

LEE B. HANCOCK.